United States Patent [19]

Rowe, deceased

[11] 4,002,454
[45] Jan. 11, 1977

[54] GLASSWARE FORMING MACHINE OF THE I. S. TYPE FOR UPRIGHT PRESS AND BLOW PROCESS

[75] Inventor: George E. Rowe, deceased, late of Wethersfield, Conn., by Selma S. Rowe, executrix

[73] Assignee: Emhart Industries, Inc. Hartford, Conn.

[22] Filed: Nov. 26, 1975

[21] Appl. No.: 635,666

Related U.S. Application Data

[62] Division of Ser. No. 545,777, Jan. 31, 1975.

[52] U.S. Cl. .................................. 65/229; 65/305; 65/321; 65/323; 65/361; 65/362

[51] Int. Cl.² .................... C03B 9/00; C03B 11/00; C03B 11/06

[58] Field of Search ............ 65/305, 323, 362, 229, 65/361, 321

[56] References Cited

UNITED STATES PATENTS

| | | | |
|---|---|---|---|
| 2,881,564 | 4/1959 | Olson | 65/305 X |
| 3,383,193 | 5/1968 | Bailey | 65/323 X |
| 3,472,642 | 10/1969 | Irwin | 65/323 X |
| 3,586,494 | 6/1971 | Mumford | 65/323 X |
| 3,914,120 | 10/1975 | Foster | 65/361 X |

Primary Examiner—S. Leon Bashore
Assistant Examiner—Frank W. Miga
Attorney, Agent, or Firm—McCormick, Paulding & Huber

[57] ABSTRACT

The individual section of a Hartford I. S. type machine is modified to permit forming the parisons in an upright orientation, and also for transferring the upright parisons from the blank to the blow side of the section without disturbing this upright orientation. The pressing plungers at the blank station are mounted for movement toward and away from the upwardly open blank mold cavities, and each blank mold cavity is defined in part by partible neck ring molds, in part by a lower solid blank or body mold, and finally by intermediate partible mold sections which engage the upper neck ring molds and also the lower body mold. These intermediate mold sections at the blank side of the machine are mounted on the existing blank mold holder arms. The neck ring molds are provided in a structure which is pivotally supported at the free ends of the two neck ring arms, and while these arms are conventionally mounted for pivotal movement in the neck ring mechanism, means is also disclosed for restricting these neck ring structures to so support the parisons that each remains in an upright orientation during transfer from the blank to the blow side of the machine section.

5 Claims, 3 Drawing Figures

GLASSWARE FORMING MACHINE OF THE I. S. TYPE FOR UPRIGHT PRESS AND BLOW PROCESS

This is a division of application Ser. No. 545,777, filed Jan. 31, 1975.

BACKGROUND OF THE DISCLOSURE

In a conventional Hartford I. S. type of glassware machine, a plurality of independent sections are operated in timed relationship to one another, and individual gobs of molten glass are fed to the blank side of each of these sections also in timed relationship with one another. Each section has one or more upwardly open blank molds for receiving the gob, or groups of gobs and a baffle is adapted to move in and close the open end of the blank mold in order to permit the gob to be pressed or otherwise formed from below in order to form an inverted parison at the blank station. This inverted parison is transferred or swung over to the blow side of the section where it assumes an upright orientation in a finishing mold. A blow head descends onto the top of the finishing mold and the parison is blown to its final shape while the transfer mechanism returns with the neck ring mold in order to form another parison or parisons.

The parison transfer mechanism in each of the individual sections of such a machine comprises two neck ring arms mounted in an axially split neck ring mechanism or hub structure, which structure includes means for rotating these arms through approximately 180°. The neck ring mold halves are mounted at the free ends of these arms and when the parison has been formed at the blank station the still closed neck ring mold halves serve to clamp the newly formed parisons therebetween as the neck ring arms move from the inverted parison position at blank station, to an upright position at the blow station. Once positioned in the finishing mold, the neck ring arms move apart slightly, by axial movement of the associated arms, to release the parison and permit the arms and the neck ring molds to return to the blank side of the machine.

The principle aim of the present invention is to adapt a glassware forming machine section of the foregoing type in order to permit forming of the parison in an upright configuration, and for transfer of the parison to the blow side of the machine while maintaining this upright orientation.

SUMMARY OF THE INVENTION

In adapting a conventional Hartford I. S. type glassware machine to the formation of upright parisons at its blank side, and to provide for transfer of these upright parisons to the blow side of the machine, the blank station has at least one upwardly open blank mold cavity defined by a body mold, which body mold may be of the solid type, and also at the blank mold staton an intermediate mold is provided which may be of the split type and mounted on the existing blank mold holder arms. The two halves of the partible neck ring molds, carried by the two neck ring arms respectively, mate with the intermediate and the body mold portions defining the blank mold structure. The neck ring arms pivotally support the neck ring structure adjacent the free ends thereof, and a hub structure pivotally and slidably supports the other ends of these arms for movement between the blank station and the blow station, and for movement toward and away from one another so as to permit releasing of the parison at the blow side of the machine section. Finally, means is also provided for mechanically driving at least one of the neck ring molds structures as the arm is moved between said stations whereby the parison and neck ring structure remain in a predetermined orientation with respect to the fixed frame of the machine during transfer.

DETAILED DESCRIPTION

Figure 2:
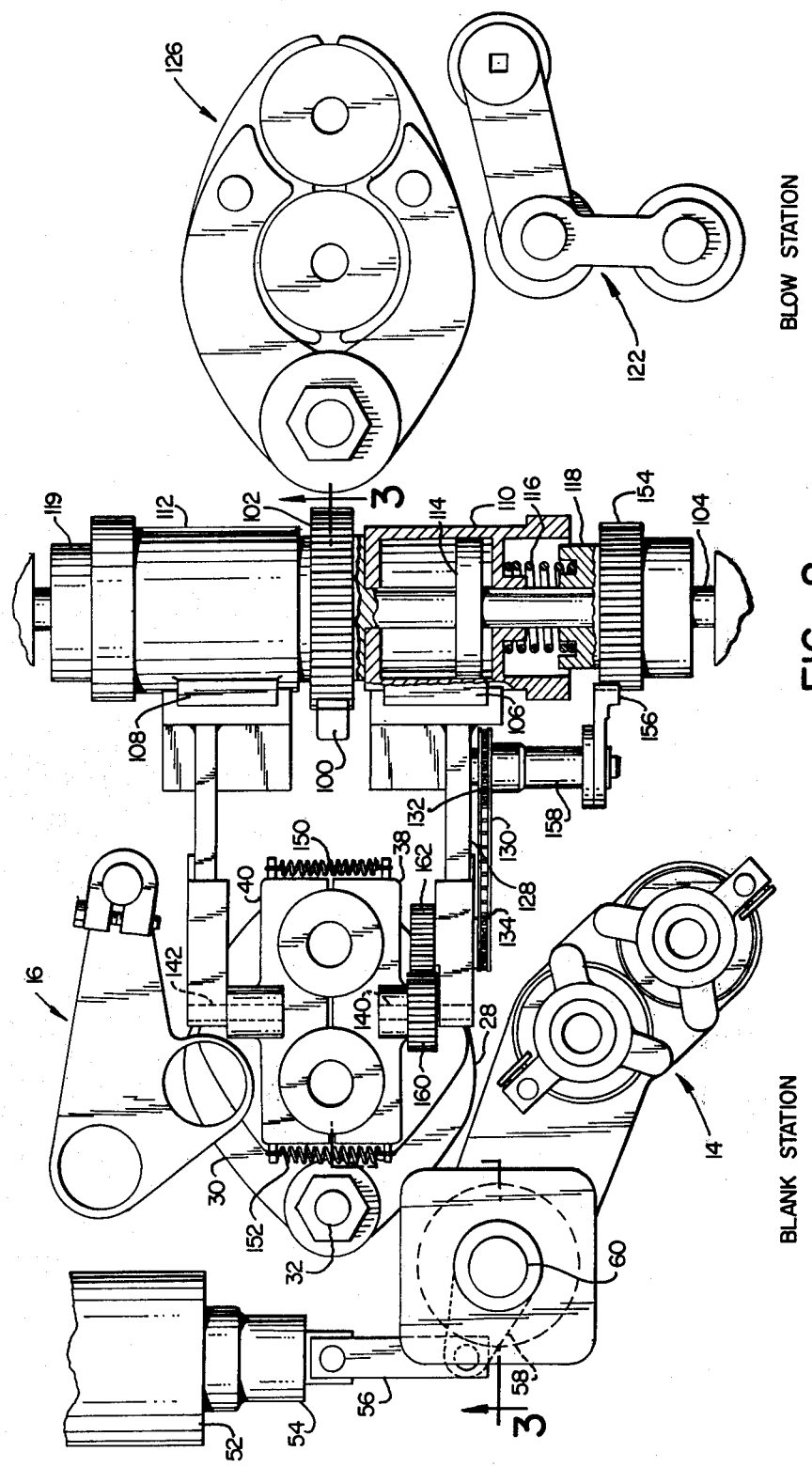
FIG. 2 is a plan view of the glassware forming machine section depicted in FIG. 1, with a portion of the neck ring structure broken away.
Figure 3:
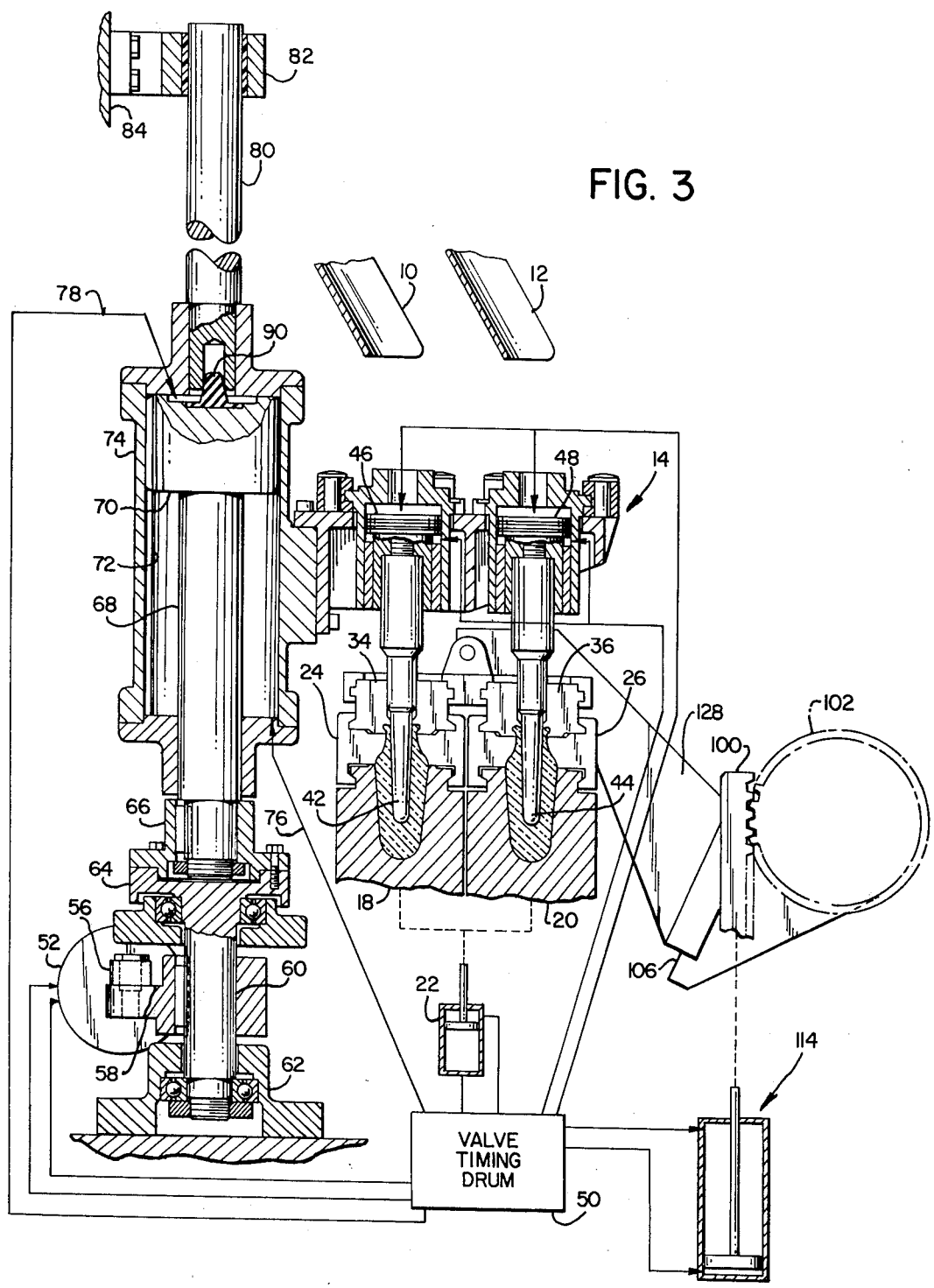
FIG. 3 is a vertical sectional view taken generally on the line 3—3 of FIG. 2, but showing the parison forming plungers inserted into the blank mold defining structure at the blank station, and also showing in schematic fashion the conventional timing means used to operate the various fluidic devices or components of the typical glassware forming machine.

Turning now to the drawings in greater detail, FIG. 3 shows the blank side or station of a glassware forming machine of the Hartford I. S. type wherein one or more gobs of molten glass are adapted to be delivered into the upwardly open blank mold cavities through the medium of fixed chutes 10 and 12 associated with each of the cavities in the blank mold structure. Upon loading of the gobs of glass in the blank mold structure the plunger mechanism, indicated generally at 14, would be positioned in its inactive position as best shown in FIG. 2 in order to permit the gobs of molten glass to be dropped into the upwardly open blank mold structure. Further, and still with reference to FIG. 2, a funnel mechanism indicated generally at 16 is adapted to be swung inwardly over the upwardly open blank mold cavities for guiding these gobs of glass as they are dropped downwardly from their associated chutes 10 and 12 into the blank mold structure. This blank mold structure will now be described in greater detail.

While not necessarily so limited it is to be noted that the blank mold structure illustrated in FIG. 3 may be similar to that shown and described in my issued U.S. Pat. No. 3,765,862. That is, the blank mold structure may include a relatively wide cavity lower body mold, a relatively narrow neck ring mold structure, and an intermediate or transitional mold which is placed between the neck mold and the body mold so that the parison can be formed. The transitional or intermediate mold is split, the two halves being mounted to the conventional blank mold holder arms provided in a Hartford I. S. type machine. As so constructed and arranged the intermediate mold halves open after the parison has been formed to permit the parison to reheat and stretch, the body molds being dropped, or retracted downwardly slightly, so that even before transfer takes place a segment of the cycle is devoted to reheat at the blank station.

With particular reference to FIG. 3, the relatively wide cavity body mold or molds are depicted at 18 and 20, and a fluid motor in the form of an air cylinder 22 is provided for raising and lowering these solid body molds 18 and 20. The intermediate or transitional molds 24 and 26, associated with these body molds 18 and 20 respectively, are mounted to the blank mold holder arms best shown in FIG. 2 at 28 and 30. These intermediate molds 24 and 26 are of the partible type, being mounted in pairs to the mold holder arms 28 and 30 in a conventional manner. Thus, a hinge pin 32 is provided in the fixed frame of the machine and these mold holder arms 28 and 30 are pivotally supported thereby, and are adapted to be operated in timed relationship with other components of the machine through conventional mold holder arm moving links (not shown).

Still with reference to the blank mold structure, the neck ring portions of the blank mold defining structure comprises split or partible neck ring molds segments 34 and 36, which neck ring mold halves or segments are also provided in pairs, and are preferably mounted in a cartridge structure best illustrated in FIG. 2 at 33 and 40. Thus, the blank mold structure of FIG. 2 is of the double gob configuration which permits two articles to be formed at one time in each of the various individual sections of a typical glassware forming machine. Each of the blank mold cavities is defined by three cooperating elements as defined in the form of a solid blank body mold 20, an associated intermediate mold 26, and the neck ring mold 36. It should be noted that the intermediate molds 24 and 26 mounted to the mold holder arms 28 and 30 are adapted to clamp the neck ring mold segments in position and in association with the body molds. It should perhaps be noted that when the gobs of molten glass have been fed into the upwardly open blank mold cavities, prior to the configuration depicted in FIG. 3, that the funnel 16 cooperates with the solid body mold in order to receive the gobs of molten glass which will ultimately be formed by the pressing plungers 42 and 44.

As mentioned previously, these plungers 42 and 44 are mounted to an associated supporting structure 14, and will occupy an inactive position such as shown in FIG. 2 when this charge loading step occurs. However, once the gobs have been so deposited in the upwardly open blank mold cavity, the funnels move away and means is provided for moving the plunger supporting arm 14 from the position shown in FIG. 2, and for causing these plungers to descend into the positions shown for them in FIG. 3, whereby the gob is formed into relatively heavy walled parisons at the blank side or station of the machine.

In addition to the means for moving the pressing plunger mechanism from and to the positions mentioned in the previous paragraph, each of these pressing plungers is individually movable vertically with respect to its associated mounting structure 14. The means for so moving these plungers comprise pistons 46 and 48 to which the plungers are adjustably mounted in order to provide an added degree of freedom for each of the blank structures, and also, in order to provide two active positions for these plungers, one determined by the basic means for moving the plunger supporting arm 14 and a slightly lower pressing position for these plungers as depicted in FIG. 3 whereby the parisons are completely formed in their associated cavities at a slightly later instant of time. The timing for control of the plungers, and also for control of all of the various machine components is derived through the timing drum indicated schematically at 50 in FIG. 3, and air lines associated with each of the various valves in the valve block portion of the timing mechanism provide signals for operation of the various fluid devices in the glassware forming machine. The reader is referred to any of the disclosures in the many patents issued on the timing features of a typical glassware forming machine of this type, and particularly to the U.S. Pat. No. 1,911,119 issued to Ingle in 1933, for a more detailed discussion of these control features in a typical machine section.

The plunger supporting structure 14 is operated from and to the position described above by two air cylinders one of which is shown at 52, which actuator 52 has a movable portion 54 connected to one end of a link 56, the other end of said link being connected to a crank arm 58 attached to rock shaft 60. This shaft 60 is shown to best advantage in FIG. 3, and has a lower end which is rotatably supported in a support bearing 62 and the upper end of such shaft 60 carries a flange 64 which is attached to and adapted to rotate a fitting 66. The fitting 66 provides a support for the lower end of a shift 68, and thus extension and retraction of the movable portion 54 of the actuator 52 causes angular rotation of this shaft 68 in order to move the plunger mechanism between the position shown in FIG. 14 and that depicted in FIG. 3.

In order to achieve vertical movement of the plunger supporting arm 14, shaft 68 has a piston 70 provided adjacent its upper end, which piston is splined as shown at 72 in order that rotation of the shaft 68 is also imparted to the housing portion 74 of this actuator. An air line 76, from the timing mechanism 50, provides air under pressure to the lower end of housing 74, and thereby lower the housing 74 to the position shown and hence lowering the plunger supporting arm 14, to the position shown for it in FIG. 3. When the plunger supporting arm 14 is to be raised from its active position shown to its inactive position (not shown) air under pressure in line 78 to the upper end of housing 74 provides the means for lifting the housing 74 and the associated plunger supporting arm 14 and it is noted that rotation of the shaft 68 will occur once the plungers have cleared the blank mold cavities, such rotation being achieved by retraction of the actuator 52 as described previously.

An upper support shaft 80 is provided in association with the upper end of the housing 74 in order to further support the housing 74 and to better react the forces generated by the plungers 42 and 44. Finally, the upper end of this support shaft 80 is rotatably supported in a fixed bracket 82 provided in the fixed frame of the machine as indicated generally at 84. Finally, and still with reference to the means for so moving the plungers a cushioning device 90 is provided at the upper surface of the piston 70 and this cushion 90 mates with a corresponding opening defined in the vertically reciprocable housing 74 in order to cushion the downward movement of the plungers 42 and 44. As noted previously individual pistons 46 and 48 are provided in the plunger supporting arm 14 to achieve the pressing movement of the plungers 42 and 44 and to properly form the neck portion of the parisons.

Turning next to a more detailed description of the neck ring mold structure, and also to the mechanism for moving the neck ring mold structure from the blank to the blow side of the machine section, a vertically reciprocable rack rear 100 is conventionally provided generally centrally of the machine section, and cooperates with a gear 102 located in centered relationship on a laterally extending shaft, best shown in FIG. 2 and comprising a part of the ring mechanism or hub structure. The said shaft and hub structure rotate the neck ring arms in a conventional fashion from and to the blank sides of the glassware forming machine section. However, the neck ring arms depicted in the drawings differ from those utilized previously in that the outer end portions thereof are adapted to pivotally support the neck ring structures 38 and 40, and also in that means is provided for retaining these neck ring structures in a particular orientation with respect to the fixed frame of the machine, not only as the parisons are formed at the blank station, but also as the neck ring structure and its associated parisons are transferred from the blank to the blow side of the machine as suggested in FIG. 1.

The inner or pivoted ends of the neck ring arms are conventionally mounted to gibs 106 and 108 provided for this purpose on the neck ring structure and more particularly on the splined cylinders 110 and 112 respectively which cylinders are adapted to rotate in response to rotation of the gear 102, that is in response to vertical movement of the rack gear 100. The rack gear 100 is driven from an actuator 114 which actuator in turn is operated through a valving device associated with the timing mechanism 50 of the machine section. These neck ring arms are also movable toward and away one another generally axially with respect to the neck ring hub structure of FIG. 2. Such means is indicated schematically in FIG. 2 and comprises a conventional element of the present combination, and hence need not be described in detail herein. Basically, however such means includes a pair of axially spaced annular pistons 114 provided on the shaft 104 and splined cylinders 110 and 112 associated with said pistons and adapted to be moved axially in one direction in response to air pressure from the valve timing mechanism 50 and in the opposite direction when such air pressure is cut off, and coil compression springs 116 act between the splined cylinders and axially fixed flanges 118 and 119.

Figure 1:
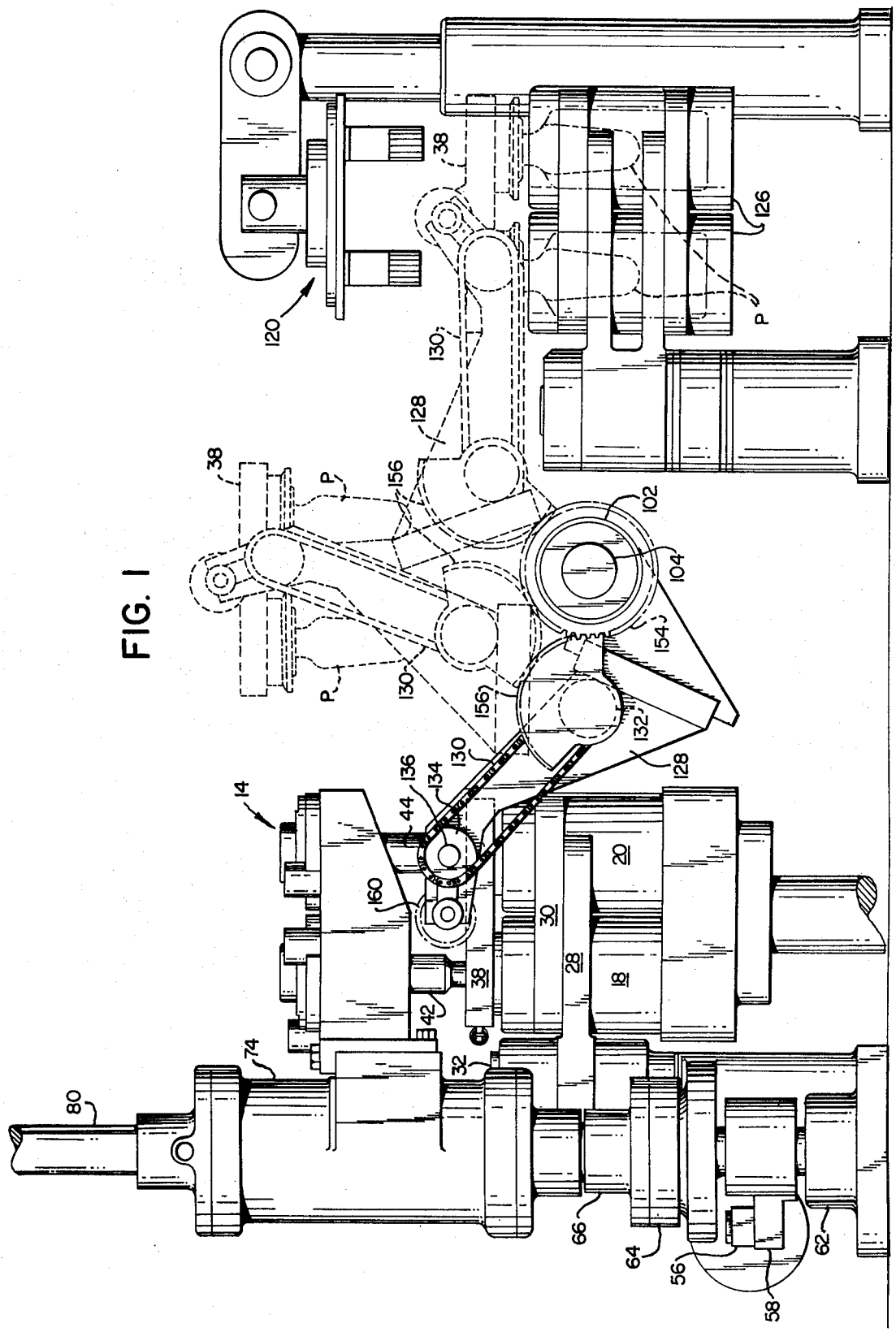
FIG. 1 is a side elevational view of the relevant portions of an individual glassware forming machine section with certain movable parts being shown in broken lines to illustrate alternative positions for such parts.

This axial movement of the neck ring arms is necessary to release the parisons at the blow station, and when the parisons P, P have been so located, as suggested in FIG. 1, and the blow or final finishing molds 126 have closed at the blow side or station of the machine section, the neck ring arms move apart releasing the parison for final forming in response to conventionally operated blow heads in the structure indicated generally at 122 in FIG. 2. These blow heads are adapted to move angularly in a horizontal plane and then downwardly onto the tops of the finishing molds structure once the neck ring arms and neck ring molds have started their return motion to the blank side of the machine. Air for operation of the mechanism for so moving the blow heads as well as the blow air itself is provided under the control of the timing mechanism 50. So, too, the means for moving the split blow molds is air operated in a conventional fashion, and need not be described in detail herein.

Referring now more specifically to the means for transferring the neck ring mold structures 38 and 40 in an orientation which will keep the parisons P, P upright, not only during forming at the blank station, but also during movement to the blow side of the machine, said means preferably comprises mechanical drive means associated with at least one of the neck ring arms and includes an endless chain 130 entrained over the sprockets 132 and 134 carried, respectively, adjacent the pivoted and the free ends of said one neck ring arm 128. This structure is shown to best advantage in FIG. 2 where one of the neck ring mold structures 38 is also depicted as pivotally supported at the free end of said neck ring arm 128 by stub shaft 140. A second stub shaft 142 is aligned with the first such shaft 140 and it pivotally supports the other neck ring structure 40. Thus, both neck ring structures are pivotally supported at the free ends of their associated neck ring arms by the aligned stub shafts 140 and 142.

Means is preferably provided for continually aligning the neck ring mold structures 38 and 40 with respect to one another on these shafts 140 and 142, and said means comprises a pair of tension springs 150 and 152 extending across and between the neck ring structures 38 and 40 as best shown in FIG. 2. These springs bias the neck ring structures 38 and 40 toward aligned positions with respect to one another especially during return movement of the neck ring mold segments, that is when the neck ring molds are being returned from the blow to the blank side of the machine without any parison supported therebetween. The presence of the parisons P, P will align these neck ring structures during parison transfer movement, but means must be provided during return movement after the parisons are deposited at the blow station.

Still with reference to the mechanical drive means for keeping the neck ring structure 38 horizontal and hence orienting the parisons vertically during transfer, said means further includes a fixed gear 154 carried on the shaft 104 of the neck ring hub structure. The said gear 154 is adapted to mesh with a gear segment 156 provided on a rock shaft 158, which rock shaft also serves to support the sprocket 132 associated with the inner or pivoted end of the neck ring arm 128. An outer gear or idler gear 160 is provided at the free or outer end of the neck ring arm on the stub shaft 140, and said gear 160 meshes with a gear 162 (best shown in FIG. 2) located on the same shaft 138 which carries the outer sprocket 134 mentioned previously. With particular reference to FIG. 1 then, it will be apparent that as the neck ring arm 128 moves clockwise from the solid line position at the blank side, to and through the intermediate broken line position, and thence to its blow side position the neck ring structure 38 will be retained in a generally horizontal configuration or orientation with the result that the parisons P, P hang downwardly continuously as they move from the blank to the blow side of the machine section. These gear and sprocket trains, on the pivoted and outer ends of the neck ring arm rotate oppositely with respect to one another, and in the ratio of one to one, in order to provide the desired "hanging" movement of the parisons P, P.

As the neck ring arm 128 so moves, the fixed gear 154 on shaft 104 causes clockwise rotation of the gear segment 156 with the result that the chain 130 rotates in such a direction as to cause similar clockwise rotation of sprocket 134 corresponding to that of its associated sprocket 132 with the result that gear 162 also rotates clockwise causing gear 160 to rotate counterclockwise and through an angular displacement equal but opposite to that of the neck ring arm itself. Since the gear 160 is carried by stub shaft 140 it follows that the neck ring structure 38 will also rotate with respect to the arm and thereby remain in its horizontal orientation as depicted in FIG. 1 as the arm so rotates. Duplication of this mechanical mechanism associated with the left-hand neck ring arm is avoided by virtue of the fact that when the parison is carried by the neck ring mold segments the right-hand neck ring structure 40 must follow its counterpart or left-hand neck ring mold structure 38. As mentioned previously, during return movement of the neck ring arms the neck ring mold structures are maintained in corresponding positions as a result of the alignment or tension springs 150 and 152. Thus, the path of the parisons formed at the blank station as they are transferred to the blow side of the machine it is best illustrated in FIG. 1, wherein these parisons are illustrated as hanging downwardly throughout the path of their travel facilitating the formation of glassware articles by an upright press and blow process in a glassware forming machine section of the Hartford I. S. type. Heretofore, the press and blow process in a typical Hartford I. S. type glassware forming machine section has required that the parison or blank be formed in an inverted orientation and be rotated into an upright orientation with respect to the frame of the machine even as the neck ring arm transfers the parison to the blow station. In the operation of a glassware forming machine at relatively high speed it has been found that this compound swinging movement of the parison caused by rotation with respect to the fixed frame of the machine during such transfer has caused undue twisting action and undue stress in the area of the neck where the parison is supported, all of which disadvantages are avoided in a modified or improved glassware forming machine section of the type described herein.

I claim:
1. In a glassware forming machine having a blank mold station, the improvement comprising:
 a. structure defining at least two blank mold cavities for receiving gobs of glass dropped downwardly therein,
 b. partible neck ring mold structures including neck ring molds mating with said blank mold cavity defining structure at the blank station,
 c. parison forming plungers for insertion downwardly into said blank mold cavities,
 d. support means for said plungers including a vertically oriented fluid motor with a vertically movable part,
 e. a plunger supporting arm carried by said movable fluid motor part,
 f. individual fluid motor means associated with each plunger, each individual fluid motor means having a first part mounted in said supporting arm and a second part movable with respect to the first and connected to an associated plunger, and
 g. means for moving said plunger supporting arm horizontally between an active position wherein said plungers are located above the blank mold cavities and an inactive position to one side thereof to permit said gobs to be so dropped into the blank mold cavities.

2. The combination defined in claim 1 wherein said blank mold defining structure comprises one piece body molds having upwardly open cavities for receiving the glass gobs, and partible intermediate molds horizontally movable in the machine for clamping the neck ring molds to the body molds and cooperating therewith to define said blank mold cavities.

3. The combination defined in claim 2 wherein said body molds are movable vertically to separate said body molds from the parisons from said blank mold cavity defining structure.

4. The combination defined in claim 1 wherein said vertically reciprocable fluid motor movable part comprises a hollow cylindrical housing, a piston in said housing, a shaft for said piston, means for preventing rotational movment between said shaft and said housing and said means for moving said plunger supporting arm horizontally comprising a fluid motor with a movable part connected to said shaft for rotating it through an angular displacement such that said plungers move between said active and inactive positions.

5. The combination defined in claim 4 wherein a lower end of said shaft is rotatably support in the fixed frame of the machine, and wherein the upper end of the shaft is also supported for rotation in the machine frame.

* * * * *